United States Patent Office 3,057,754
Patented Oct. 9, 1962

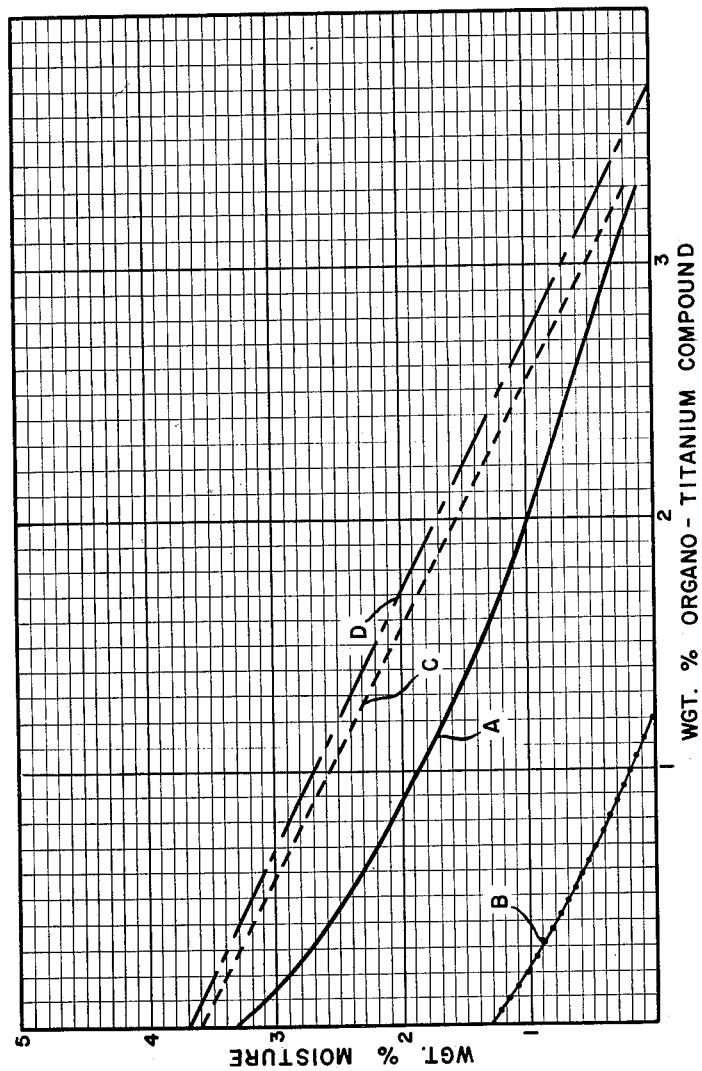
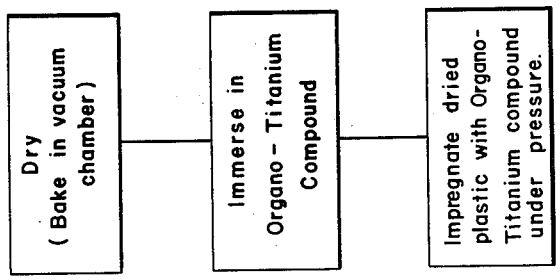
John W. Rowen,
John B. Rust
INVENTORS.
BY.
ATTORNEY.

3,057,754
METHOD FOR IMPREGNATING A DRIED PLASTIC MATERIAL
John W. Rowen and John B. Rust, Los Angeles, Calif., assignors to Hughes Aircraft Company, Culver City, Calif., a corporation of Delaware
Filed July 8, 1958, Ser. No. 747,166
2 Claims. (Cl. 117—138.8)

The invention relates to plastic materials and to methods for rendering such materials impervious to moisture or otherwise characterized by an extremely low moisture capacity. A particular feature of the invention is a method which permits otherwise completely processed and cured plastic articles to be treated so as to reduce and maintain their capacity to absorb and retain moisture to substantially zero.

It has been observed that many finished plastic materials are capable of absorbing appreciable amounts of moisture, for example, as much as 3% by weight. The absorption of such amounts of moisture affects not only the weight of the plastic materials or articles formed thereof but also the electrical and other physical properties are degraded. Such absorbed moisture can alter the dielectric constant of a plastic radome in a missile, for example, or enhance chemical reactions with the plastic materials so as to result in the physical weakening thereof. Absorbed moisture also appears to be a definite causative factor in the blistering of certain plastics at elevated temperatures.

It is therefore an object of the instant invention to provide an improved cured plastic material whose capacity to absorb moisture is substantially negligible.

Another object of the invention is to provide an improved method for treating cured plastic materials so as to permanently reduce the capacity thereof to absorb moisture to substantially zero.

These and other objects and advantages of the invention are achieved by driving out substantially all of the moisture in a plastic material and then impregnating the dried plastic materials with an organo-titanium compound under pressure and temperature. It has been discovered that such organo-titanium compounds not only "plug" or fill any interstices capable of containing moisture but also unexpectedly form chemical bonds with the host plastic material thereby becoming chemically as well as physically integral therewith. Such chemical bonding apparently is possible because of the presence of hydrophilic or polar groups in the host plastic materials.

The invention will be further described in connection with the drawings wherein:

FIG. 1 is a schematic "flow"-type block diagram or chart of the steps of the method of the invention; and FIG. 2 shows the relationship between the percentage of water sorption and the percentage of the organo-titanium compound in various plastic materials.

THE METHOD

Referring to the flow chart shown in FIG. 1, according to the invention, the capacity of cured plastic materials to absorb moisture may be substantially reduced by first thoroughly drying the material by baking in a vacuum chamber. The baking temperature should be maintained under the temperatures at or above which the plastic materials are deleteriously affected. Phenolic plastic materials, for example, may be safely baked at a temperature of 135° C. The time of baking is determined by the amount of moisture present initially in the plastic and the speed of removal thereof during baking at the particular baking temperature selected. Since it is desired to remove all or the maximum amount of moisture possible from the plastic material, baking may be continued until there is no further change in the weight of the plastic material being processed. This indicates that the maximum amount of moisture has been extracted from the plastic material.

The next step in the method of the invention is to immerse the dried plastic material in an organo-titanium compound and subject the liquid to a relatively high pressure. If the compound is solid, it is necessary first to prepare a solution of it in a suitable organic solvent. In many cases the organo-titanium compound is a liquid and may be used undiluted. The pressure selected is determined by the length of time desired to achieve impregnation of the plastic material with the organo-titanium compound. In the case of phenolic plastic materials, for example, maximum impregnation is achieved in 96 hours utilizing a pressure of about 5,000 pounds per square inch. Again, an excellent indication of maximum impregnation is given when there is no further weight change in the plastic material.

It is also preferred during impregnation to maintain the organo-titanium compound at some elevated temperature to enhance the suspected chemical reactions between the organo-titanium compound and the "host" plastic material. In the case of phenolic plastic materials, for example, a suitable temperature is about 150° C.

The method of the invention has been successfully practiced on plastic materials such as the phenolics, silicones, epoxy, and triallyl cyanurate-polyester in laminated applications thereof.

BAKING TEMPERATURES AND TIMES

As a guide in practice of the invention, the following table sets forth presently known suitable exemplary baking times and temperatures for the various plastic materials. It should be appreciated that the purpose of the baking step is to remove a desired amount of moisture from the plastic and that therefore a considerable range of times and temperatures is available to achieve this end. The baking times shown are those required to obtain the maximum removal of the moisture present in the plastic.

| Plastic | Wt. Percent of H$_2$O Initially Present | Baking Temp., ° C. | Baking Time (Hours) |
|---|---|---|---|
| Phenolic | 3.3 | 135 | 48 |
| Silicone | 1.2 | 135 | 48 |
| Epoxy | 3.6 | 135 | 72 |
| Triallyl cyanurate-polyester | 3.7 | 135 | 96 |

IMPREGNATION PRESSURES AND TIMES

As a further guide in the practice of the invention, the following table sets forth presently known exemplary impregnation pressures and times for various plastic materials. As in the case of baking times and temperatures, a considerable range of pressures and times is available to achieve the impregnation of a desired amount of organo-titanium compound into the plastic. The impregnation times given are those required to obtain maximum impregnation of the organo-titanium compounds at 100° C.

| Plastic | Pressure (p.s.i.) | Time (Hrs.) | Wt. Percent of Impregnated Organo-Titanium Compound |
|---|---|---|---|
| Phenolic | 1,000 | 48 | 3.3 |
| Silicone | 3,000 | 48 | 1.2 |
| Epoxy | 5,000 | 72 | 3.3 |
| Triallyl cyanurate-polyester | 5,000 | 96 | 3.7 |

THE ORGANO-TITANIUM COMPOUNDS

The materials of the invention with which plastic materials may be impregnated to render the plastic materials substantially non-absorbent are organo-titanium compounds shown in the following list. It should be appreciated that this table does not purport to be a complete listing of all available suitable organo-titanium compounds but is only illustrative of the range of possible choices thereof.

Ortho esters of titanium:
    Tetraisopropyl titanate
    Tetrapropyl titanate
    Tetrabutyl titanate
    Tetraisobutyl titanate
    Tetratertiary butyl titanate
    Tetra ethyl titanate
    Tetra 2-ethyl hexyl titanate
    Tetra stearyl titanate
    Tetra β-chloroethyl titanate
Titanium acylates:
    Titanium stearate
    Titanium oleate
    Titanium soy acylate
    Isopropoxy titanium stearate
    Isopropoxy titanium oleate
    Isopropoxy titanium soy acylate
Titanium chelates:
    Octylene glycol titanate
    Triethanolamine titanate
    N salts of triethanolamine titanate
    Titanium lactate

Example I

A cured phenolic plastic panel laminated with glass cloth was dried at 135° C. until a constant weight was obtained which occurred in about 48 hours. The panel comprised a 6-ply laminate and was approximately 4″ x 4″ in size. The dried panel was placed in one liter of tetraisopropyl titanate and maintained under a pressure of about 1,000 p.s.i. and at a temperature of about 100° C. until a constant weight was obtained which occurred in about 48 hours. The amount of tetraisopropyl titanate impregnated in the panel as shown by curve A in FIG. 2 is about 3.3% by weight. When subjected to a heat treatment, the impregnated panel withstood a temperature of 370° C. for over 60 seconds without delamination and without blistering. In comparison, an untreated panel when subjected to the same temperature, delaminated within 11 seconds and blistered excessively.

Example II

A cured phenolic plastic panel approximately 10″ x 10″ in size was dried at 135° C. until a constant weight was obtained which occurred in about 10 hours. The dried panel was then placed in one liter of tetraisopropyl titanate and maintained under a pressure of about 500 p.s.i. and at a temperature of about 60° C. until a constant weight was obtained. As in Example I, about 3.3% by weight of tetraisopropyl titanate was impregnated into the panel. This panel likewise withstood a temperature of over 320° C. for more than 60 seconds without blistering.

Example III

A cured silicone resin plastic panel about 4″ x 4″ in size, laminated with glass cloth, was dried at 135° C. until a constant weight was obtained which occurred in about 48 hours. The panel comprised a 4-ply laminate. The dried panel was placed in 1 liter of tetra n-butyl titanate and maintained under a pressure of about 3,000 p.s.i. and a temperature of about 100° C. until a constant weight was obtained which occurred in about 48 hours. The amount of tetra n-butyl titanate impregnated in the panel as shown by curve B in FIG. 2 is about 1.2% by weight. This panel withstood a temperature of about 370° C. without delaminating or blistering for over 60 seconds.

Example IV

A panel comprising a 4-ply laminate with glass cloth and cured phenolic resin plastic about 4″ x 4″ in size was dried at 135° C. until a constant weight was obtained which occurred in about 48 hours. The dried panel was then placed in 1 liter of tetra 2-ethyl hexyl titanate and maintained therein under a pressure of about 3,000 p.s.i. and a temperature of about 100° C. until a constant weight was obtained. The amount of tetra 2-ethyl hexyl titanate impregnated in the panel was about 3.3% by weight. This panel withstood a temperature of over 370° C. for more than 60 seconds without delamination or blistering.

Example V

A cured phenolic resin plastic panel substantially identical with the panel of Example IV was baked, impregnated, and subjected to the same heat test as described in connection with the panel of Example IV except that the organo-titanium compound employed was tetra stearyl titanate. The amount of organo-titanium compound impregnated was again about 3.3% by weight and the panel withstood the test temperature of 320° C. for more than 60 seconds without delamination or blistering.

Example VI

A cured phenolic resin plastic panel substantially identical with the panel of Example IV was processed substantially the same as the panel of Example IV except that the organo-titanium compound employed was octylene glycol titanate. About 3.3% by weight of octylene glycol titanate was impregnated into the panel which subsequently withstood a temperature of 320° C. for over 60 seconds without delamination or blistering.

Example VII

A cured phenolic resin plastic panel substantially identical with the panel of Example IV was processed substantially the same as the panel therein except that the organo-titanium compound employed was triethanolamine titanate. About 3.3% by weight of triethanolamine titanate was impregnated into the panel which subsequently withstood a temperature of 320° C. for over 60 seconds without delamination or blistering.

Example VIII

A cured phenolic resin plastic panel substantially identical with the panel of Example IV was processed substantially the same as the panel of Example IV except that the organo-titanium compound employed was the N-salt of triethanolamine titanate. About 3.3% by weight of the N-salt of triethanolamine titanate was impregnated into the panel which subsequently withstood a temperature of 370° C. for over 60 seconds without delamination or blistering.

Example IX

A panel comprising a 4-ply laminate of glass cloth and cured triallyl cyanurate-polyester about 4″ x 4″ in size was dried at 135° C. until a constant weight was obtained which occurred in about 96 hours. The dried panel was then placed in 1 liter of tetra isopropyl titanate and maintained therein under a pressure of about 5,000 p.s.i. and a temperature of about 200° C. until a constant weight was obtained. About 3.7% by weight of tetra isopropyl titanate was impregnated into the panel which subsequently withstood a temperature of 370° C. for over 60 seconds without delamination or blistering.

Example X

A panel comprising a 4-ply laminate of glass cloth and cured epoxy resin plastic about 4″ x 4″ in size was dried at 135° C. until a constant weight was obtained which occurred in about 72 hours. The dried panel was then placed in 1 liter of tetra isopropyl titanate and maintained therein under a pressure of about 5,000 p.s.i. and a temperature of about 100° C. until a constant weight was obtained. About 3.7% by weight of tetra isopropyl titanate was impregnated into the panel which subsequently withstood a temperature of 370° C. for over 60 seconds without delamination or blistering.

Referring particularly to FIG. 2, it will be noticed that in general the weight percentage of organo-titanium compound impregnated into the plastic is nearly the same or very comparable to the moisture capacity of the plastic. Thus, for example, phenolic plastics having about 3.3% by weight absorbed moisture can be impregnated with about 3.3% by weight of organo-titanium compound as shown by curve A. The moisture capacity of silicone resin plastics is about 1.3% by weight while the impregnated organo-titanium compound is 1.2% by weight as shown by curve B. With respect to epoxy resin plastics (curve C) and triallyl cyanurate-polyester plastics, (curve D) the figures are 3.6:3.3 and 3.7:3.7, respectively. It will be appreciated that circumstances may make it desirable or feasible to only partially reduce the moisture capacity of a plastic by the method of the invention while still achieving an improvement in the properties thereof. This is brought out with especial force in the following table setting forth the delamination time in seconds and the extent of blistering in percentage of area blistered for a number of phenolic plastic panels impregnated with varying amounts of tetra isopropyl titanate (from 0.0 to 1.4% by weight) and containing various amounts of water. It should be kept in mind in evaluating the following data that those samples indicated as having 0.0% moisture have the capacity to absorb moisture and that the 0.0% moisture obtained only during the test period. All panels were subjected to a temperature of 370° C. in vacuum during the test procedure.

| Sample No. | Percent Moisture | Percent Organo-titanium Compound | Delamination (seconds) | Blistering (area) |
|---|---|---|---|---|
| 1 | 0.9 | 0.0 | 11 | up to 25%. |
| 2 | 1.2 | 0.0 | 11 | up to 75%. |
| 3 | 1.4 | 0.0 | 27 | up to 50%. |
| 4 | 1.5 | 0.0 | 5 | 25 to 75%. |
| 5 | 0.0 | 1.1 | over 60 | 0. |
| 6 | 0.0 | 1.3 | ---do--- | 0. |
| 7 | 0.0 | 1.4 | ---do--- | 0. |
| 8 | 2.0 | 0.3 | ---do--- | up to 25%. |
| 9 | 2.1 | 0.3 | ---do--- | Do. |
| 10 | 2.1 | 0.5 | ---do--- | 0. |
| 11 | 2.2 | 0.5 | ---do--- | up to 50%. |

There thus has been shown and described a method for treating cured plastic materials so as to reduce the capacity thereof to absorb moisture to substantially zero. As has been indicated by the examples described and the data presented herein, modifications may be made in the practice of the method of the invention without departing from the spirit thereof.

What is claimed is:

1. The method of treating a cured plastic material comprising the steps of: drying the plastic material at superatmospheric temperature and subatmospheric pressure to a substantially constant weight, and impregnating the dried plastic material with an organo-titanium compound by immersing the plastic material in a bath at superatmospheric pressure containing the titanium compound until the plastic material is substantially saturated by filling the interstices of the plastic material with the titanium compound.

2. The method of treating a cured plastic material comprising the steps of: drying the plastic material at superatmospheric temperature below about 135° C. and at subatmospheric pressure to a substantially constant weight, and impregnating the dried plastic material with from about 1 to about 4 percent of an organo-titanium compound by immersing the plastic material in a bath at superatmospheric pressure below about 5,000 p.s.i. containing the titanium compound until the plastic material is substantially saturated by filling the interstices of the plastic material with the titanium compound.

References Cited in the file of this patent

UNITED STATES PATENTS

| 2,519,728 | Alexander | Aug. 22, 1950 |
| 2,684,307 | Knapman et al. | July 20, 1954 |
| 2,768,909 | Haslam | Oct. 30, 1956 |
| 2,795,820 | Grow et al. | June 18, 1957 |
| 2,898,229 | Herr et al. | Aug. 4, 1959 |

FOREIGN PATENTS

| 125,450 | Australia | Sept. 25, 1947 |

OTHER REFERENCES

Industrial and Engineering Chemistry, October 1949, page 7A pertinent.

Industrial and Engineering Chemistry, February 1950, pages 251–253 pertinent.